Dec. 8, 1942. O. WERTHER 2,304,721
HYDRAULIC TRANSMISSION
Filed Feb. 1, 1941  4 Sheets-Sheet 1

INVENTOR.
ODIN WERTHER
BY Kuris Hudson & Kent
ATTORNEYS

Dec. 8, 1942.  O. WERTHER  2,304,721

HYDRAULIC TRANSMISSION

Filed Feb. 1, 1941  4 Sheets-Sheet 2

INVENTOR.
ODIN WERTHER
BY Kris Hudson & Kent
ATTORNEYS

Dec. 8, 1942.  O. WERTHER  2,304,721
HYDRAULIC TRANSMISSION
Filed Feb. 1, 1941   4 Sheets-Sheet 3

INVENTOR.
ODIN WERTHER
BY
Kwis Hudson & Kent
ATTORNEYS

Dec. 8, 1942.    O. WERTHER    2,304,721
HYDRAULIC TRANSMISSION
Filed Feb. 1, 1941    4 Sheets-Sheet 4

INVENTOR.
ODIN WERTHER
BY Kwis Hudson & Kent
ATTORNEYS

Patented Dec. 8, 1942

2,304,721

UNITED STATES PATENT OFFICE 2,304,721

HYDRAULIC TRANSMISSION

Odin Werther, East Cleveland, Ohio, assignor to Eaton Manufacturing Company, Cleveland, Ohio, a corporation of Ohio Application February 1, 1941, Serial No. 377,036

3 Claims. (Cl. 103—115)

The present invention relates to hydraulic power transmitting apparatus wherein power is transmitted from one member to another by a plurality of vane wheels rotating in a liquid. More particularly, the invention relates to the construction of the vane wheels and to the method of making the same.

An object of the present invention is the provision of a novel and improved vane wheel or wheels for use in hydraulic power transmitting devices, which vane wheels will be simple and rugged in construction, light in weight, efficient in operation, and easy and inexpensive to manufacture by mass production methods.

Another object of the invention is the provision of a novel and improved method of making vane wheels used in hydraulic power transmitting devices, which method is adapted to mass production methods and wherein the vanes per se are made separate from the supporting structure or wheels and are securely and permanently connected thereto in a simple, convenient and inexpensive manner.

The present invention relates to certain details of construction and combinations and arrangements of parts and further objects and advantages thereof will be apparent to those skilled in the art to which the invention relates from the following description of the preferred embodiment thereof described with reference to the accompanying drawings in which similar reference characters designate corresponding parts, and in which.

Figure 1:
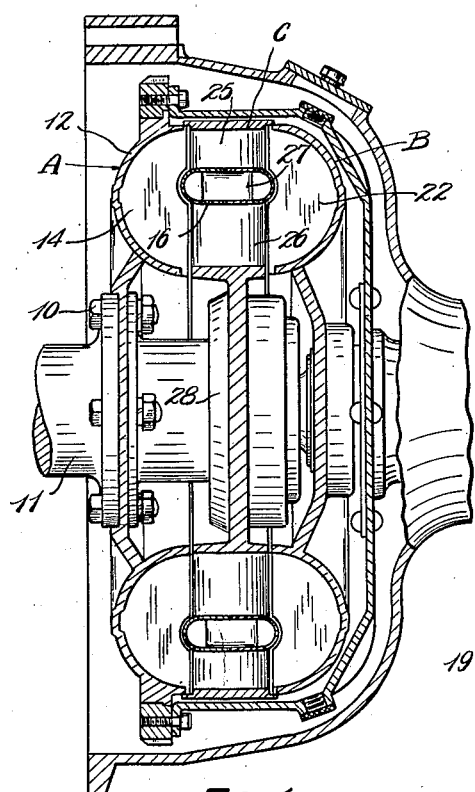
Fig. 1 is a longitudinal section, with parts in elevation, of the vane wheel portion of a hydraulic power transmitting device embodying the present invention.

Referring to the drawings, Fig. 1 shows the vane wheel portion of a hydraulic power transmitting device embodying the present invention. The hydraulic power transmission device shown in Fig. 1 is similar to that shown in a copending application of Robert C. Russell, Serial No. 319,926 filed February 20, 1940, except for the construction of the vane wheels, and only that part of the transmission which is necessary to a complete understanding of the present invention is herein shown and described. For a description of the entire transmission, reference is made to the aforesaid application.

The transmission shown is of the three-element type comprising an impeller wheel, designated generally by the reference character A, connected as by bolts 10 to the crankshaft 11 of an internal combustion engine; a reaction wheel B mounted on an overrunning clutch which holds the same against reverse rotation relative to the direction of rotation of the impeller wheel while leaving it free to revolve in the opposite direction; and a vane wheel C interposed between the impeller wheel A and the reaction wheel B, and operatively connected to the driven shaft, not shown. While the transmission shown is referred to herein as being of the three-element type, provision is made for connecting the reaction wheel B to the impeller wheel A in which event the transmission operates as a two-element hydraulic transmission, ordinarily referred to as a fluid clutch, all as is fully explained in the aforesaid application.

The impeller wheel A comprises a supporting structure or shell 12 dished as illustrated to form an annular recess 13, semi-circular in cross-section, opening axially of the impeller wheel, and within which a series of blades 14, preferably sheet metal stampings, are securely and permanently fixed.

The main body portions of the vanes 14 are flat and semi-circular in shape to conform with the recess 13 in which the vanes are positioned. As previously stated, the recess 13 opens axially of the vane wheel and the vanes 14 which are positioned radially therein have semi-circular cut-out portions 15 in their straight sides which conform to and accommodate one side of a core ring or a turbine blade mounting ring 16 forming a part of the turbine wheel C. As shown, the upper and lower ends of the vanes 14 are provided with relatively small projections or lugs 17 formed integral thereon which engage within suitable apertures or slots 18 formed in the supporting shell 12 around the periphery of the recess 13. In addition to the lugs 17, each of the vanes 14 includes a relatively large extension or projection 19 formed integral therewith and projecting at right angles to the main body portion of the vane. The projections 19 fit into a groove 20 formed in the rear wall of the recess 13 and are of such a length that they properly space the vanes. In other words, the free end of the projection 19 engages the side of the adjoining vane which is adjacent thereto.

Figures 3, 4, 5:
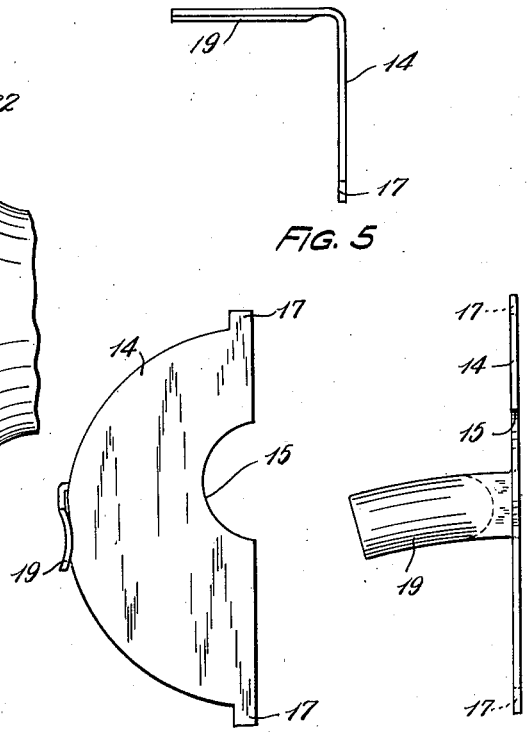
Fig. 3 is a side elevational view of one of the vanes of the impeller wheel shown in Figs. 1 and 2 as it appears prior to assembly with the supporting shell.
Fig. 4 is a front elevational view of the vane shown in Fig. 3.
Fig. 5 is a plan view of the vane shown in Fig. 3.
Figure 2:
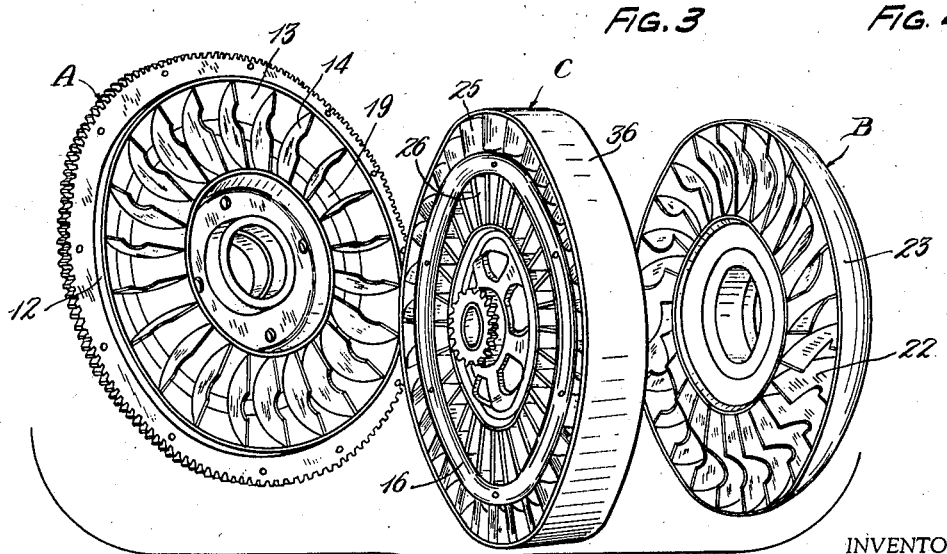
Fig. 2 is a perspective expanded view of the vane wheels shown in Fig. 1.
Figure 6:
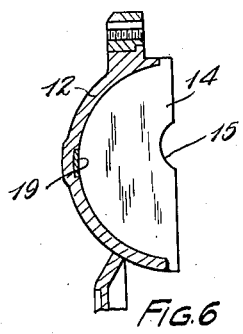
Fig. 6 is an enlarged view of a portion of Fig. 1.

The extensions or projections 19 are preferably initially curved transversely, as clearly shown in Figs. 3, 4, and 5, and as the vanes are assembled with the shell 12, the projections 19 are located in the grooves 20, after which the projections are hammered or otherwise made flat expanding the same into tight engagement with the sides of the groove 20 which fixedly secures the projections 19 and in turn the vanes 14 in the shell 12. The outer ends of the vanes 14 are secured in the shell 12 by peening or otherwise forcing the metal of the shell adjacent the slots 18 over the lugs 17, thus closing or partly closing the slots or openings 18 after the vanes are in position.

Figure 7:
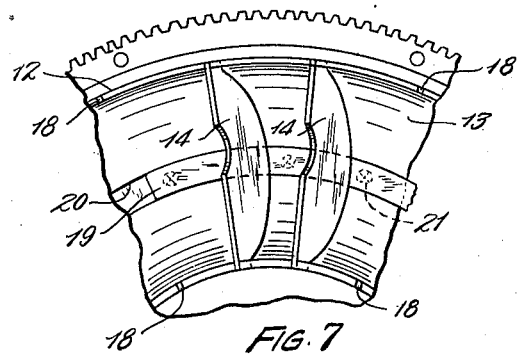
Fig. 7 is a perspective view of a portion of the impeller wheel shown in Figs. 1 and 2, with parts omitted to better show the construction.

If desired, means other than that already described for securing the vanes 14 within the shell 12, such as welding, may be employed, or the means shown may be supplemented with welding, for example, the projections 19 and/or the lugs 17 can be welded to the shell 12. Fig. 7 shows the projections 19 spot welded at 21 to the shell 12. The depth of the groove 18 is such that after the projections 19 are in position, their exposed surfaces are flush with the inside of the shell 12, making a continuous surface which will not obstruct the flow of the fluid in the transmission. The shell 12 can be die-cast or stamped out of sheet metal as can the vanes 14. The projections 19 in addition to securely holding the vane in position assure the proper spacing of the vanes. The manner of forming the impeller wheel A just described produces a strong construction and one which is susceptible of manufacture by mass production methods.

Figure 8:
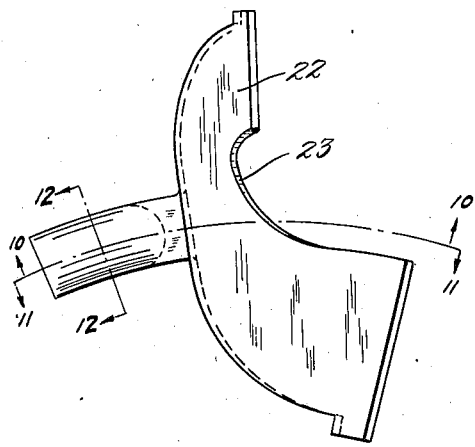
Fig. 8 is a front elevational view of one of the vanes of the reaction wheel shown in Figs. 1 and 2 as it appears prior to assembly with the supporting shell.
Figure 9:
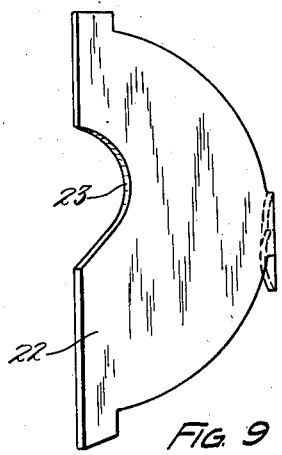
Fig. 9 is a side elevational view of the vane shown in Fig. 8.
Figure 10:
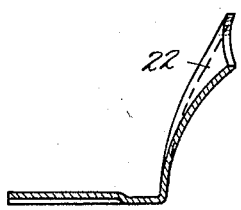
Fig. 10 is a sectional view on the line 10—10 of Fig. 8.
Figure 12:
Fig. 12 is a sectional view on the line 12—12 of Fig. 8.
Figure 11:
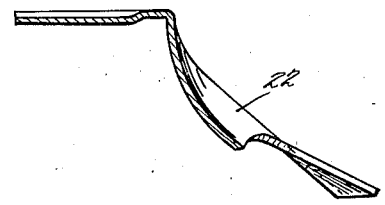
Fig. 11 is a sectional view on the line 11—11 of Fig. 8.

The reaction wheel B is similar in construction to the impeller wheel A, just described, and is constructed in a similar manner. The only difference between the two wheels insofar as the vane assembly is concerned is the difference in the shape of the vanes. Where the vanes 14 of the impeller wheel are substantially flat, the vanes 22 of the reaction wheel are curved in the manner shown in Figs. 8, 10 and 11. Like the vanes 14, the vanes 22 are provided with cut-out portions 23 to accommodate the opposite side of the core-ring or turbine blade mounting ring 16. The blades 22 are preferably fixed in the supporting shell 23 of the reaction wheel in the same manner that the blades 14 are fixed in the supporting shell 12. The impeller and reaction wheels A and B face in opposite directions and the turbine wheel C which comprises two radially spaced series of vanes 25 and 26 separated by the core-ring 16 is located therebetween. The construction is such that when the transmission is operated as a torque converter, a substantially closed, circular path is formed through which the fluid circulates in the direction indicated by the arrows, see Fig. 1.

Figure 13:
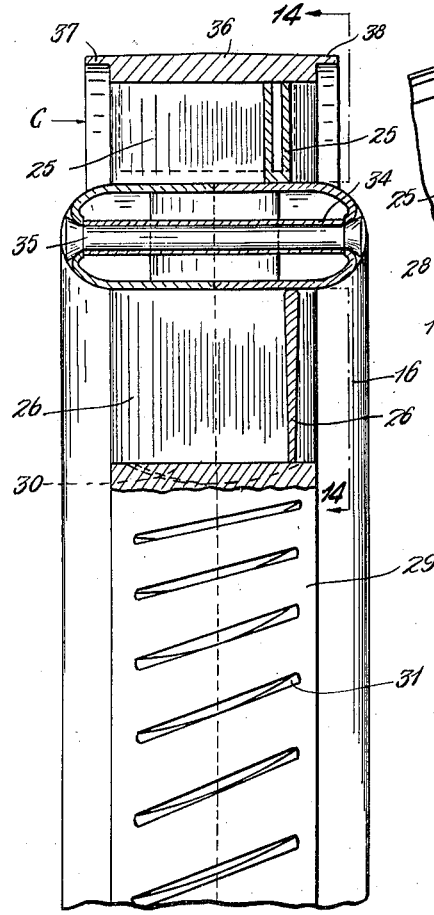
Fig. 13 is a sectional view of the turbine blade shown in Figs. 1 and 2, approximately on the line 13—13 of Fig. 14, with portions in elevation.
Figure 14:
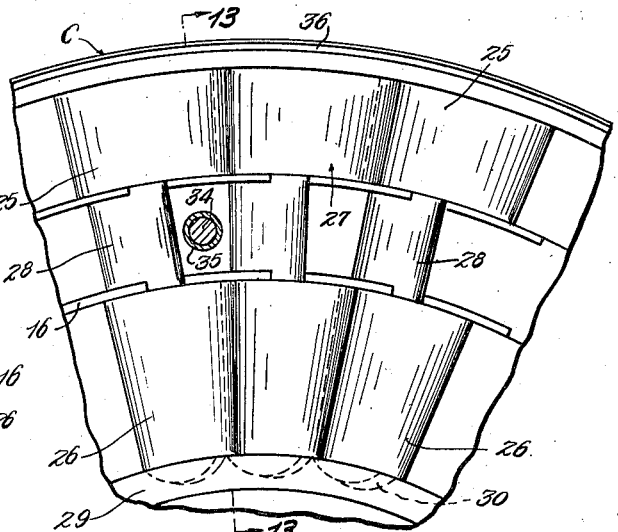
Fig. 14 is a sectional view of the turbine wheel shown in Fig. 1, approximately on the line 14—14 of Fig. 13, with portions in elevation.
Figure 15:
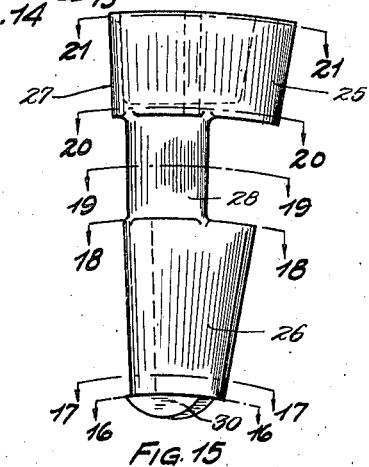
Fig. 15 is a perspective view of one of the blades of the turbine wheel shown in Figs. 1 and 2.
Figures 16, 17, 18, 19:
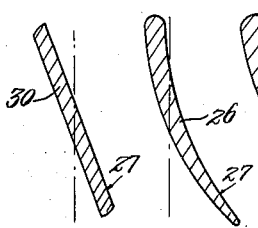
Fig. 16 is a sectional view on the line 16—16 of Fig. 15.
Fig. 17 is a sectional view on the line 17—17 of Fig. 15.
Fig. 18 is a sectional view on the line 18—18 of Fig. 15.
Fig. 19 is a sectional view on the line 19—19 of Fig. 15.
Figure 20:
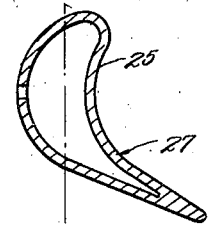
Fig. 20 is a sectional view on the line 20—20 of Fig. 15.

The vanes 25 and 26 of the turbine wheel C are preferably equal in number and formed integral as shown in Fig. 15. In other words, each turbine blade, designated generally by the reference character 27, comprises two vane portions 25 and 26 connected by an intermediate portion 28. The turbine blades are preferably assembled with the supporting hub 29 or internal planetary gear in one of three ways. As shown in Figs. 13, 14, and 15 the turbine blades are formed with a semi-circular lug 30 on the radially inner ends thereof which fit into suitable semi-circular grooves 31 in the periphery of the member 29. After the vanes are assembled with the member 29 they are fixedly held in place therewith by the core-ring or turbine blade mounting ring 16 through which the intermediate portions 28 of the blades project.

Figure 21:
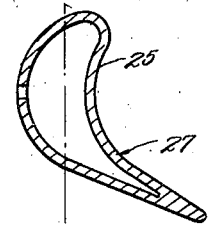
Fig. 21 is a sectional view on the line 21—21 of Fig. 15.

The core-ring 16 comprises two parts secured together by spacers 34 and rivets 35, any suitable number of which may be provided. The core-ring 16 is preferably either a die casting or a sheet metal stamping and the two-part construction affords easy assembly with the turbine blades. When the turbine blades extend through the core-ring 16, the ring is provided with apertures which conform to the cross-sectional shape of the blades and as the two halves of the ring are drawn together, the blades are securely clamped therein. Preferably the vane portions 25 of the turbine blades are made hollow as shown in Fig. 21 to reduce the weight as much as possible while the rest of the blades, including the connecting portions 29 which are of reduced cross section, are made solid. The assembly of the turbine wheel is completed by shrinking a turbine blade ring or shroud ring 36 in place about the outer ends of the turbine blades. The ring 36 has portions 37 and 38 formed integral therewith which overlie the adjacent edges of the impeller and reaction wheels respectively.

Figure 22:
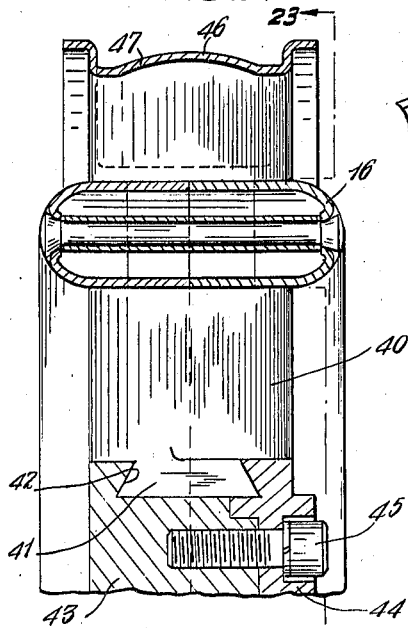
Fig. 22 is a sectional view showing a turbine wheel of modified construction approximately on the line 22—22 of Fig. 23, with portions in elevation.
Figure 23:
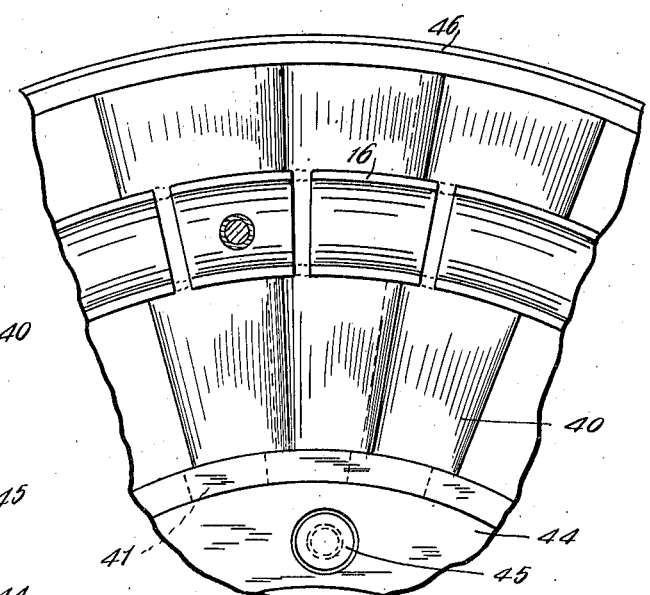
Fig. 23 is a sectional view approximately on the line 23—23 of Fig. 22, with portions in elevation.

As an alternative construction for the turbine wheel, the inner ends of the turbine blades may be dovetailed and fit into suitable slots in the supporting hub, and/or the outer ends of the blades may be rounder or made in some irregular shape. Figs. 22 and 23 show a construction comprising blades 40 similar to the blades 30 except for the dovetailed projections 41 on their inner ends and the shape of their outer ends. The projections 41 fit into suitable slots 42 formed in the supporting hub or member 43 and are fixedly held therein by a mounting ring 44 bolted as by the bolts 45 to the member 43. In assembling the turbine wheel shown in Figs. 22 and 23, the blades are preferably first assembled in the outside turbine blade ring 46 which is shaped to conform to the curved outer ends 47 of the blades, after which the two-part core-ring or the turbine blade mounting ring 16 is assembled therewith and secured in place. With the use of a suitable expanding tool, the assembly can then be mounted on the supporting hub or member 43 and locked in place by the mounting ring 44. It is to be understood that with this construction, the hub member 43 and the mounting ring 44 are recessed to form suitable grooves for receiving and securely holding the dovetailed portions 41 of the turbine blades.

Figure 24:
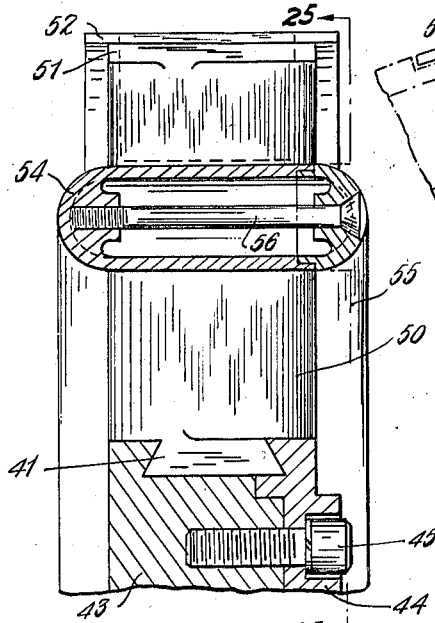
Fig. 24 is a sectional view showing a turbine wheel of a different modified construction approximately on the line 24—24 of Fig. 25, with portions in elevation.
Figure 25:
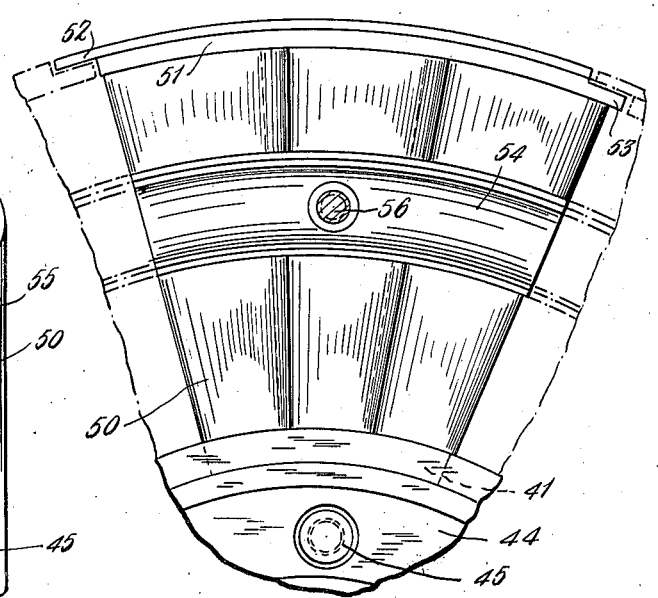
Fig. 25 is a sectional view approximately on the line 25—25 of Fig. 24, with portions in elevation.

The turbine blades are preferably die castings and if desired a plurality of blades may be cast together and integrally connected by portions which form the outside turbine blade ring and/or a part of the core-ring. This construction is shown in Figs. 24 and 25. As shown in these figures, three blades, designated generally as 50, are formed integral and the adjacent ends of the portions 51 which form the outside turbine blade ring are preferably so formed as at 52 and 53 that they overlap each other. The left-hand section 54 of the core-ring, as viewed in Fig. 24, is also formed integral with the blades. As shown, the construction of the inner ends of the blades 50 and the periphery of the hub member is like that shown in Figs. 22 and 23 and after a plurality of blade segments have been assembled in place on the hub member, they are secured in position by applying the mounting ring 44 and the section 55 of the core-ring. The section 55 of the core-ring shown in Figs. 24 and 25 is in the form of an annular ring adapted to be secured to the blade segments by bolts 56. Interfitting abutting surfaces on the sections 54 and 55, which together form the core-ring, align the blade segments and make the assembly more rigid.

From the foregoing description of the preferred embodiment of the invention, it will be apparent that the objects heretofore enumerated and others have been accomplished and that there has been provided novel and improved vane wheels and methods of constructing the same which are simple and inexpensive to manufacture and are adaptable to mass production methods. While the preferred embodiments of the invention have been described in considerable detail, it will be apparent that the invention is not limited to the particular construction shown or to any particular type of transmission, and it is my intention to hereby cover all adaptations, modifications and uses thereof which come within the practice of those skilled in the art to which the invention relates.

Having thus described my invention, what I claim is:

1. A vane wheel for a hydraulic power transmitting device, said vane wheel comprising a supporting member or hub, a plurality of blades each having a plurality of radially spaced vane sections connected by an intermediate member, means for connecting said blades to said supporting member, an annular member forming a portion of the core ring of said vane wheel connected to said intermediate portion of said blades, and an annular member or shroud ring surrounding said blades and connecting the ends thereof.

2. A vane wheel for a hydraulic power transmitting device, said vane wheel comprising a supporting member or hub, a plurality of blades each having a plurality of radially spaced vane sections connected by an intermediate portion, means for connecting said blades to said supporting member, a core ring connected to said intermediate portion of said blades, and an annular member or shroud ring surrounding said blades and connecting the ends thereof.

3. A vane wheel for a hydraulic power transmitting device, said vane wheel comprising a supporting member or hub, a plurality of blades each having a plurality of radially spaced vane sections connected by an intermediate portion, means for connecting said blades to said supporting member, a two-part core ring connected to said intermediate portion of said blades, and an annular member or shroud ring surrounding said blades and engaging the ends thereof.

ODIN WERTHER.